United States Patent [19]
Curtis

[11] 3,993,582
[45] Nov. 23, 1976

[54] PULSE FOG GENERATOR

[75] Inventor: Russell R. Curtis, Indianapolis, Ind.

[73] Assignee: Curtis Dyna Products Corporation, Westfield, Ind.

[22] Filed: July 26, 1974

[21] Appl. No.: 492,035

[52] U.S. Cl. ............................. 252/359 A; 239/78
[51] Int. Cl.[2] ........................................ B01J 13/00
[58] Field of Search .................. 239/129, 77, 78, 5, 239/8, 9; 60/3, 7, 319; 252/359 A

[56] References Cited
UNITED STATES PATENTS

| | | |
|---|---|---|
| 2,768,031 | 10/1956 | Tenney ............................. 239/129 |
| 2,857,332 | 10/1958 | Tenney ............................. 239/129 |
| 2,959,214 | 11/1960 | Durr ................................. 239/77 |

Primary Examiner—Hiram H. Bernstein
Attorney, Agent, or Firm—Woodard, Weikart, Emhardt & Naughton

[57] ABSTRACT

Disclosed is a portable, pulse-jet engine powered fog producing device in which the hot engine components are mounted on one side of a vertical plate and the fuel and insecticide supply tanks are mounted on the opposite side of the plate and in which the engine components are formed to utilize natural convection currents to rapidly cool the engine after shut-down.

3 Claims, 20 Drawing Figures

PULSE FOG GENERATOR

BACKGROUND OF THE INVENTION

Fogging devices, used to generate an insecticide fog, for example, and utilizing the pulse-jet (resonant intermittant combustion) principle, are well known in the prior art. An example of such structure is disclosed in Tenney et al U.S. Pat. No. 2,857,332 and the pulse jet engine operation is there explained in some detail. A fogging apparatus utilizing a resonant, intermittant combustion device, a fuel supply, an insecticide supply and a starting device is disclosed in Curtis U.S. Pat. No. 3,151,454. The apparatus of the present invention represents an improved version of such prior art devices.

The apparatus of the present invention provides a thermal barrier between the engine and the fuel and insecticide tank components. The engine has a housing configuration and air vent orientation such that convection air currents reduce or eliminate the substantial temperature rise of parts of the apparatus occuring after engine shut-down, a difficulty which has plagued prior art devices. The fuel valve component provides improved fuel air atomization and mixing and substantially eliminates back-flow or blow-back of raw fuel through the air intake, a condition heretofore inherent in pulse jet engine operation. The valve which controls flow-inducing pressurizing of the insecticide tank is provided with a vent which functions to bleed off pressure in the insecticide tank after engine shut-down, an added safety feature. The control valve, metering the flow of insecticide at a selected rate, utilizes an integrally formed conically shaped valve member of a suitable elastomeric material with a circular bead above the conical portion so that sealing of both the stem and the valve seat is accomplished by the single valve member. Several constructional features, including a vapor trap in the fuel feeding line, prevent fuel and fuel vapor from migrating into proximity with hot engine parts immediately after engine shut-down. Post-shut down ignition of fuel, a difficulty in prior art structures, is thus prevented. The apparatus is provided with additional constructional improvements referred to in the subsequent, detailed description of the device.

DESCRIPTION OF THE PREFERRED EMBODIMENTS

Figure 1:
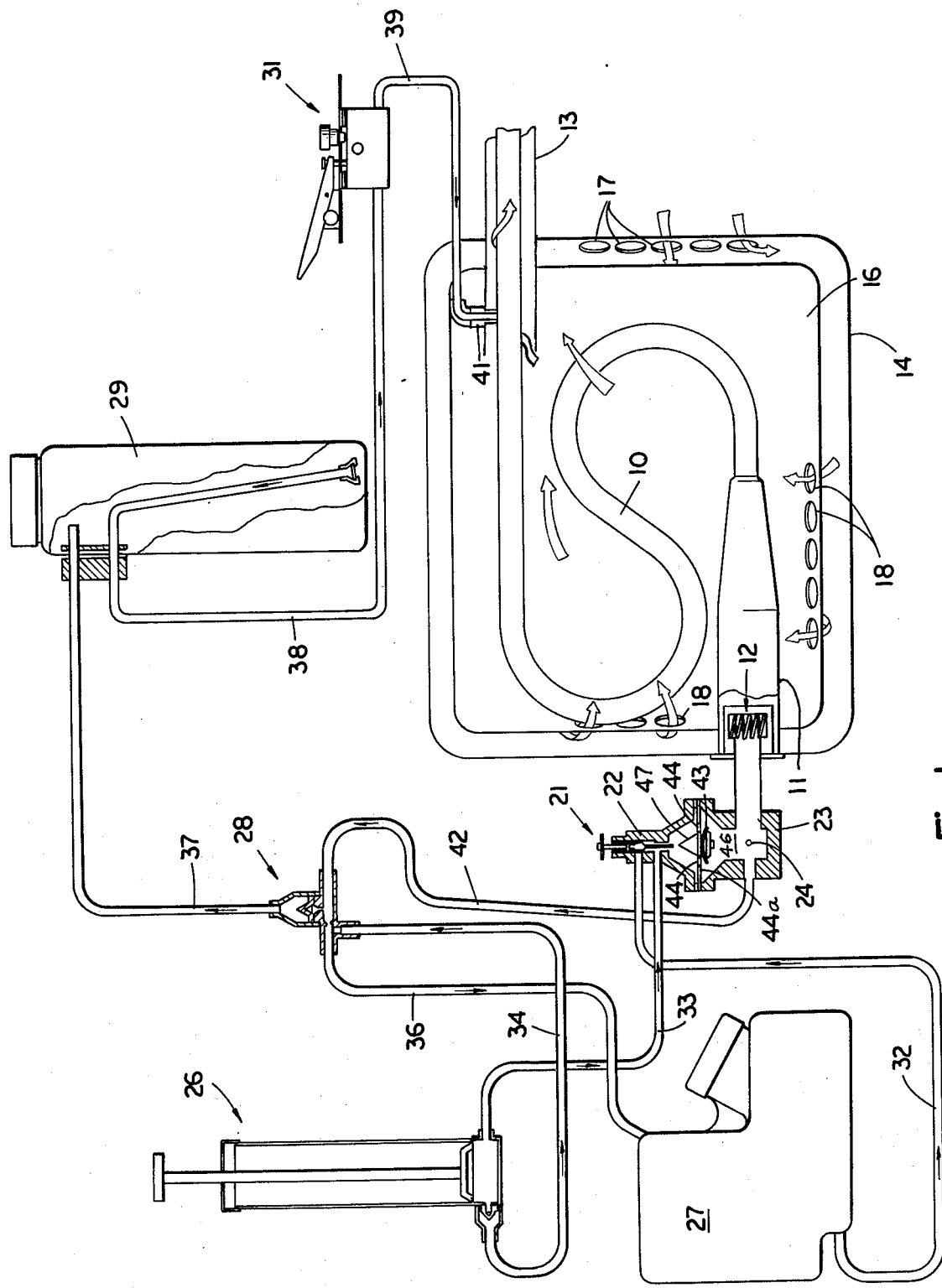
FIG. 1 is a schematic view of the primary components of the pulse fog generator of the present invention.

Referring primary to FIG. 1, the various components of the pulse fog generator device are schematically shown with interconnecting tubing. The apparatus includes a sinuous exhaust tube 10, communicating at one end with a combustion chamber 11, the combustion chamber having an electric glow coil, known in the prior art, identified at 12 and functioning as a flame holder. The other end of the sinuous tube extends through a discharge tube 13. The end of the sinuous tube 10 is spaced from the discharge tube 13 to provide an annular air passage to atmosphere.

Figure 5:
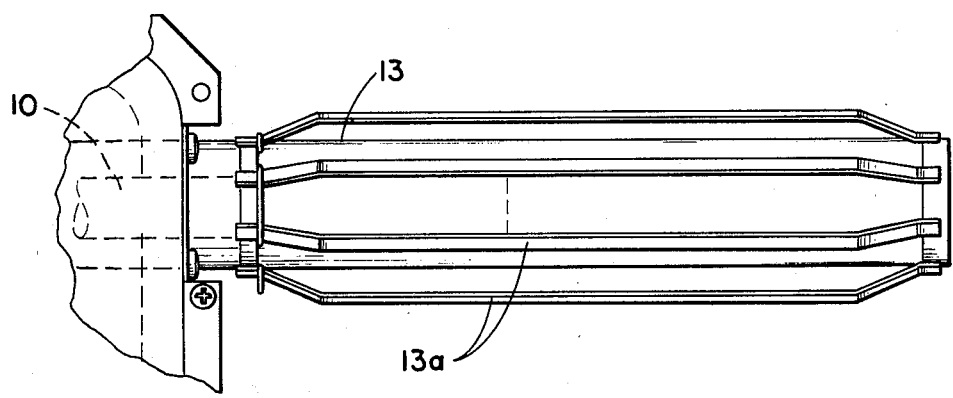
FIG. 5 is a fragmentary, detailed view of the discharge tube or duct portion of the apparatus and illustrating its connection to the exhaust tube and the exhaust tube housing.

The exhaust tube 10, although sinuous, lies in a single vertical plane and is enclosed with a flat, generally rectangular outer housing 14 and an inner housing 16 having the same general configuration as the housing 14 but nested in the outer housing, the walls of the housing 14 and 16 being spaced from each other. As may be seen in FIGS. 5 and 6, the inner housing 16 and the outer housing 14 have outwardly extending peripheral flanges which are stacked and joined together by any suitable means such as bolts 16a. The outer housing 14 is provided with a series of air intake apertures 17 which function to admit air into the space between the housings. It will be noted that the discharge tube 13 extends from and is in communication with the interior of the housing 16 but extends through the housing 14 in sealed relation thereto. The inner housing 16 is provided with air intake apertures 18 and, it will be noted, these are below the sinuous exhaust tube 10. Cooling convection currents of air move through the apertures 17, through the apertures 18, sweep over the sinuous tube 10 and exit through the annular space within the discharge tube 13 and these convection air currents circulate whether or not the resonant intermittent combustion device is in operation, the convection air currents thus serving to cool the exhaust tube rapidly after shut down of the combustion device. As previously mentioned the exhaust tube 10 a sinuous configuration. Since a design-specified length of the exhaust tube must be retained to produce satisfactory noise level and operating characteristics in a pulse-jet engine, the sinuous configuration provides a means for incorporating the required exhaust tube length in relatively restricted space. The sinuous exhaust tube 10 differs from prior art structures, however, in that the longitudinal centerline of the combustion chamber 11 and formed tube 10 lie in a single common plane thus making possible the utilization of the relatively flat, vertically disposed tube housings 14 and 16 and the thin overall contour of the complete assembly.

Figure 6:
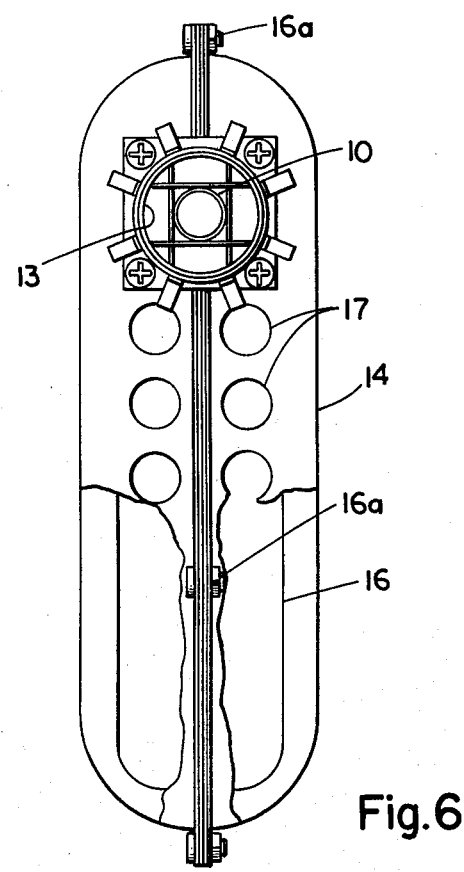
FIG. 6 is a fragmentary view of the discharge tube and the outer housing, with a portion of the outer housing broken away to reveal the inner housing.

The hottest portions of the exhaust tube 10, during engine operation are at the radiused ends of the sinuous tubes and, as will be evident from FIGS. 1 and 6, the air intake apertures 17 in the outer housing 14 and one set of apertures 18 in the inner housing 16 are located adjacent the tube bends. It will also be apparent from FIG. 1 that the combustion chamber and attached exhaust tube entrance are located at a lower corner of the nested housings 14 and 16. The cooling air moving along the outside of tube 10 is discharged from the tube 13 adjacent an upper, diagonally opposite corner of the nested housings. The hottest operating area of the engine, combustion chamber 11, is thus placed near the bottom of the engine housings and removed from the air intake apertures 17 and the air discharge tube 13. This arrangement has particular utility in that it is conductive to dissipating engine heat by convection air flow after the engine has been shut down. During engine operation and, particularly, after engine shut down air entering housing 14 through the set of apertures 18, just below combustion chamber 11, receives heat from the combustion chamber, rises and moves over the sinuous tube 10 and out the tube 13. This produces a relatively rapid cooling of the engine after shut down, eliminating the undesirable post shut down temperature rise of the engine and adjacent parts which is characteristic of prior art devices. The convection flow of cooling air described, it will be noted, continues after engine shut down and until the engine has cooled. This utilization of thermal convection to provide cooling air after engine shut down is a unique feature of the structure herein described.

Flow of fuel and air into the combustion chamber 11 is controlled by a fuel control valve indicated generally at 21 having an upper portion 22 and a lower portion 23. An electrical spark ignition means having electrodes extending into the combustion antechamber 46 is identified at 24. A manually operable charging air pump is indicated generally at 26 and a combustion fuel supply tank is indicated at 27.

A check valve indicated generally at 28 functions to pressurize the upper portion of the insecticide fluid reservoir or tank 29 in a fashion to be subsequently described in detail. A manually adjustable insecticide fluid metering valve is indicated generally at 31, the valve 31 controlling the movement of insecticide fluid in the gases discharged through the exhaust tube 10, these gases issuing as insecticide fog from the discharge tube 13. A fuel supply line 32 connects the fuel tank 27 with the fuel valve 21. Air is supplied through the valve 21 from atmosphere when the combustion device is in operation, however, upon start-up air is supplied to the combustion chamber through the valve 21 by means of the air tube or conduit 33 which receives air from the manual pump 26 when operated. The pump 26 also supplies air through the tube 34 to the intake side of the valve 28. Air pressure, through the tube 36 is thus presented in the upper portion of the fuel tank 27 and provides pressurization of the interior of the fuel tank to assure fuel feeding. Air is also supplied through the tube 37 for pressurizing the upper portion of the insecticide fluid tank 29 thereby assuring the flow of insecticide through the tube 38 to the valve 31. The tube 39 leads from the outlet of the valve 31 to the insecticide fluid injection fitting 41. During operation of the combustion device, that is, after initial start-up, the tube 42 supplies combustion chamber pressure through the body of valve 28, to the tube 36 for pressurizing the fuel tank 27 and insecticide tank 29 after manipulation of the hand pump 26 has ceased, it being understood that, as is conventional, the hand pump is utilized merely to supply start-up combustion air and to initially pressurize the fuel tank.

The valve 21 includes conventional petal valve 43 which permits one-way introduction of a combustible fuel air mixture through the apertures 44 into the combustion antechamber 46, the apertures 44 functioning as combustion chamber pressure controlled fuel delivery apertures. The valve also includes a conical deflector 47.

The valve 21, combustion chamber 11 and exhaust tube 10 function in conventional fashion as a resonant intermittent combustion device. The operation of such combustion devices is well known in the prior art and is explained in detail in Tenney et al U.S. Pat. No. 2,857,332. After initial ignition of the air-fuel charge, pulsating combustion is maintained by the engine without the necessity of further operation of the ignition means with the exhaust gases moving through the sinuous tube 10 and out the discharge end of the tube.

The components shown somewhat schematically in FIG. 1 will now be described in more detail and initial reference is to FIGS. 2, 2A, 3 and 4. As will be evident from these figures, the components are mounted on the side faces of a vertically oriented, shaped and horizontally ribbed plate 51 of relatively lightweight sheet metal.

This vertical plate 51 has attached to it all of the other components and assemblies of the complete apparatus. As may be seen in FIG. 2A, the plate 51 is shaped to enclose the insecticide tank 29 and is provided with horizontally extending ribs which rigidify the support provided by the plate. The plate 51, though made of thermally conducting sheet metal, serves as a thermal barrier between the hot engine parts, supported from one side of the plate, and the other components (fuel and insecticide tanks and engine ignition apparatus composed of the battery and ignition coil which must be protected from any substantial temperature rise during and subsequent to operation of the engine. The engine assembly is attached to the plate by four brackets 52 (FIG. 4) which support the exhaust tube housing 14 and hold it spaced from plate 51. The heat generated in the engine assembly (to be subsequently described in detail) can move to the plate 51 only by convection through the air space provided by spacing brackets 52, by radiation and by conduction through the brackets. The thin cross-section brackets 52 provide only a small heat conductive path to the plate, air moving upwardly, by convection, between the plate 51 and the engine assembly tends to remove heat from between the plate and the hot engine assembly, and loss of heat by radiation from the engine enclosure assembly is controlled by coating the enclosure with an aluminum pigmented finish.

Figure 4:
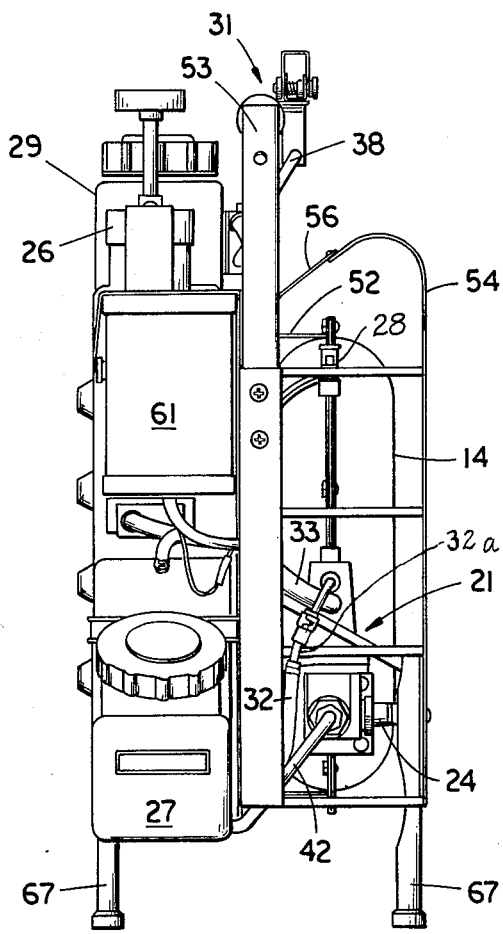
FIG. 4 is an end view of the structure shown in FIG. 2, taken from the right hand end of FIG. 2.

The valve 28 and the valve 31 and also disposed to the right of the central plate 51 (as viewed in FIG. 4). A carrying handle 53 extends upwardly from the plate and a wire guard 54 overlies the exhaust tube housing 14, the protecting guard or grill being attached at its upper end to a deflector plate 56 (FIG. 4) which extends sidewardly in inclined relation to the plate 51 and serves to deflect heat away from the handle area.

Figure 2:
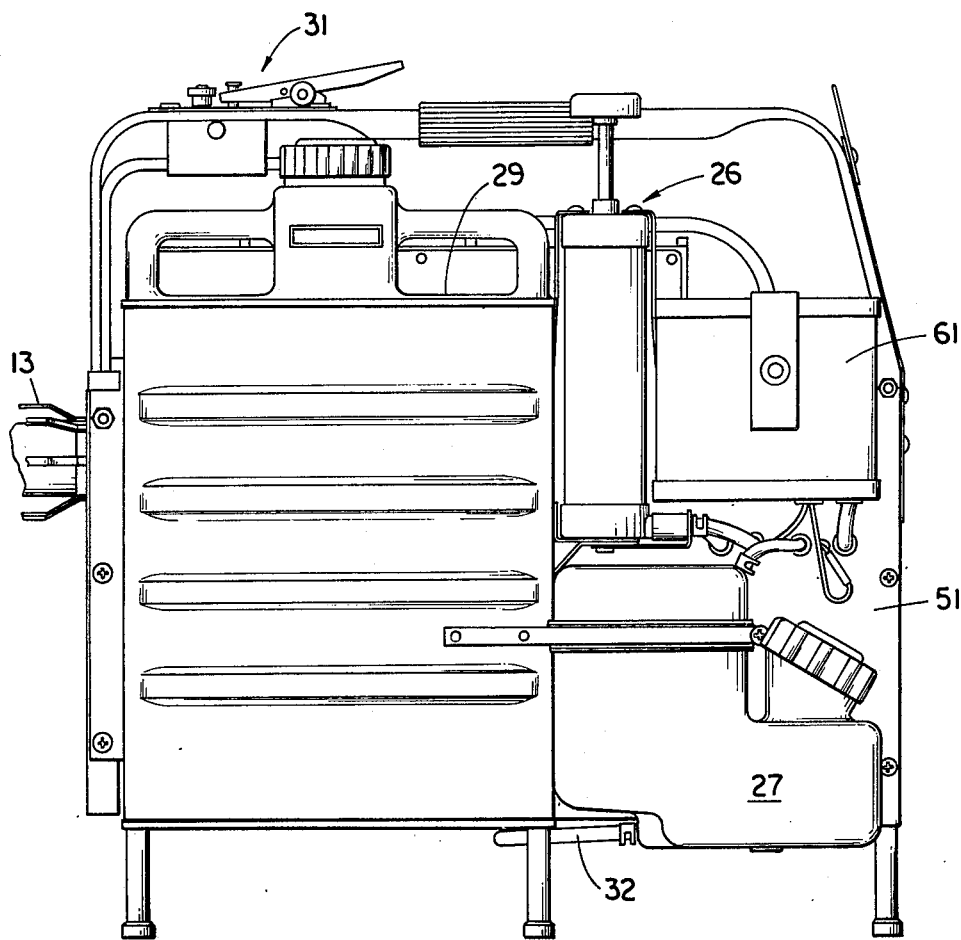
FIG. 2 is a side view of the pulse fog generator of the present invention as actually assembled and not in schematic form.
Figure 2A:
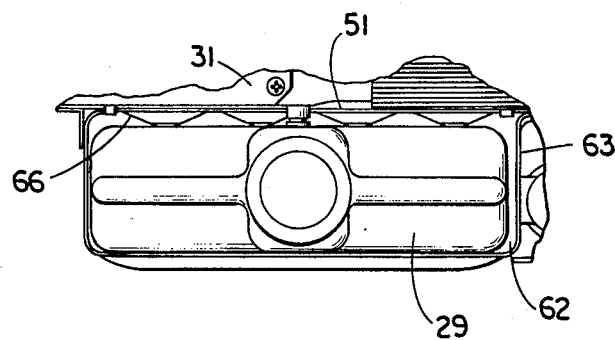
FIG. 2A is a fragmentary, top plan view of a portion of the structure shown in FIG. 2.

Referring to FIG. 2, a container 61 for accommodating a battery and ignition coil used to energize the spark means 24 and the glow coil 12 is supported on the left-hand side of the plate 51 (as viewed in FIG. 4). The hand pump 26 and the fuel tank 29 are also mounted on this side of the central, vertical plate 51. The insecticide tank 29 is accommodated within a cavity 62 formed by the shaped portion 63 of the central support plate 51 and the shield 66 (FIG. 2A) formed by a plate having vertical undulations, the shield being secured at its corners to plate 51 by metal clamps. The insecticide tank 29 is formed of semi-rigid plastic and is sized so that when unpressurized it slips easily into the cavity (FIG. 2A), but, when pressurized, resists removal from the cavity because of the pressure exerted by the bulging tank walls against the wall of the receiving cavity. The shield 66 provides further means for spacing or insulating the insecticide tank from the heat generating combustion device disposed on the opposite side of the plate 51. The vertical undulations in the shield 66 provide thermal chimneys or passages through which cooling air, entering at the base of the apparatus, may move upwardly by convection through the shield undulations to exit at the top of the assembly removing heat which has reached the plate 51 and thus further insulating the insecticide tank 29 from the heat source provided by the engine. The shield 66 thus provides a convection path for cooling air, spaces the tank 29 away from plate 51 and strengthens the total structure.

Support legs 67 extend from the central plate 51 and from the wire guard 54 to support the components above the floor or other supporting surface sufficient to permit air to enter below the engine housings and move upwardly by convection. As may best be seen in FIG. 5 the discharge tube 13 is provided with a surrounding wire guard 13a.

Figure 7:
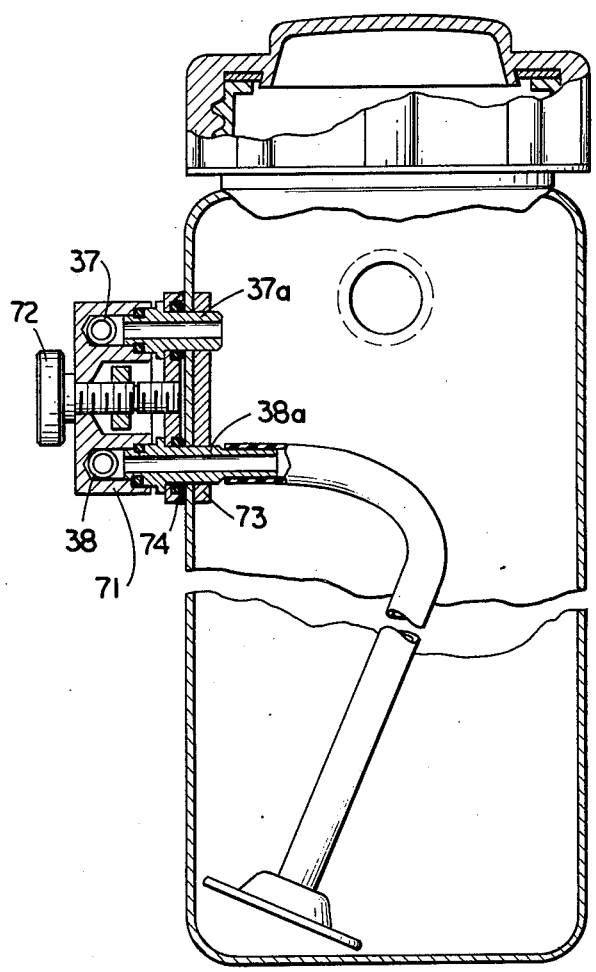
FIG. 7 is a sectional, side view of the insecticide fluid tank or reservoir.

It is desirable that the insecticide liquid tank 29 be easily removable from the apparatus when empty or when it is to be interchanged with a duplicate tank holding a different, or additional, insecticide fluid and this feature requires that the pressurizing air line and the insecticide fluid delivery line be easily and quickly detachable from the tank. The structure particularly adapted to accomplish this is shown in detail in FIG. 7. As shown in FIG. 7 the lines 37 and 38 are connected to a common removable junction block 71 which is secured to a mating assembly by a single finger-tight screw 72, the mating assembly being secured to the insecticide tank. The mating assembly consists of a backup plate 73, a face plate 74 on the outside of the container, a nipple 37a adapted to be attached to the line 37 and a nipple 38a adapted to be attached to the line 38. The two nipples 37a and 38a extend through the face plate 74 and through the container wall engaged by the backup plate 73, an o-ring or gasket seal being disposed between the face plate and the container and an o-ring or gasket seal being disposed between the appropriate shoulder of the block 71 and the nipples. To remove or replace the insecticide fluid tank 29, the screw 72 may be loosened, the junction block 71 and attached tubes 37 and 38 removed and the replacement tank, having nipples and mounting plates extending from the appropriate one of its sides installed in the tank receiving cavity and the junction block 71 again tightened onto the new of replacement fluid tank. A dummy junction block may be provided for sealing the insecticide tank either before or after it has been inserted in the supporting cavity.

Figure 8:
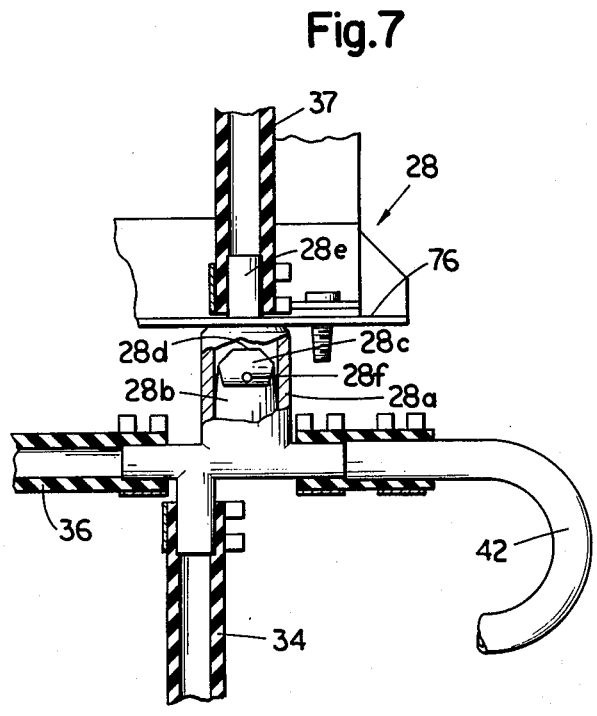
FIG. 8 is an enlarged side sectional view of the check or unidirectional valve controlling pressurization of the insecticide fluid tank shown in FIG. 7.

Referring now to FIG. 8, the insecticide pressure tank controlling check valve 28 will now be described in detail. The lower portion of the valve connects to the tubes 34, 36 and 42, previously described, and a cylindrical valve portion 28a, extending upwardly from the transverse passage through the valve, has supported in it a tubular valve member 28b formed of rubber or similar elastomer. The valve member is formed so hat it has two inclined faces (one of which is shown in FIG. 8 and identified at 28c) topped by a slot 28d formed in the member at the junction of the two inclined faces. The tubular member 28a has a reduced nipple portion 28e which extends through and is supported on the mounting plate 76. The reduced portion 28e has clamped to it the adjacent end of the flexible tube 37 leading to the upper portion of the insecticide fluid tank 29. There is a small aperture 28f formed in the inclined face 28c of the member 28b, this aperture serving as a by-pass to the slot 28d and permitting pressure to bleed back after short time interval from the downstream side of the valve member 28b once combustion has ceased in combustion chamber 11. It will be understood that pressure pulses extending in the tubular member 28a below the valve slot 28d will cause air or exhaust gases to pass through the slot 28d into the tube 37 but the pressure pulses are passed in one direction only and pressure can not reversely move through the slot 28d, although pressure extending downstream of the valve member 28b can be relieved through the aperture 28f, a preferred time interval for bleed-off of this pressure being 45 seconds. At start-up pressure pulses from the pump 26, transmitted through the tube 34, and, during combustion pressure pulses from the combustion chamber 11, transmitted through the tube 42, are utilized to pressurize the top of the insecticide fluid supply tank 29. The top of the fuel tank 27 is, of course, pressurized through the line 36 directly by line 34 from the pump 26 and by line 42 from the combustion chamber 11 without passing through the check valve member 28b.

In prior art devices it is conventional to tap pressure from the pulse jet engine, while it is operating, to pressurize both the fuel supply tank and the insecticide tank. Pressure pulses are taken from the engine and directed through a one-way or check valve and delivered to the insecticide tank, pressurizing the tank and thus inducing the desired flow of insecticide to the engine exhaust tube during engine operation. With such arrangements it is necessary to provide an additional safety valve (usually pressure responsive) in the insecticide line from the tank which closes should the engine cease operation for any reason. The necessity for this additonal valve occurs because the pressure in the insecticide tank, bulit-up during the normal operation of the engine, remains after the engine stops due to a malfunction or for any other reason, and dangerous flow of oil-based insecticide continues to the hot engine after combustion has ceased unless an engine operation responsive safetly valve is provided in the insecticide line. The aperture 28f in the valve member 28b eliminates the necessity for this additional safety valve. While the aperture does not materially affect the build up of tank pressure by engine pressure pulses through the slot 28d, it does permit the pressure in the tank to bleed back across the member 28b in a short time interval of the order of 45 seconds. Upon engine shut down, the insecticide tank is rapidly depressurized through the aperture 28f and insecticide flow to the engine ceases even though the manually operated insecticide flow control valve, to be subsequently described, is held open. The aperture 28f thus obviates the necessity of providing a conventional, additional engine combustion responsive safety valve in the insecticide fluid line.

Figure 9:
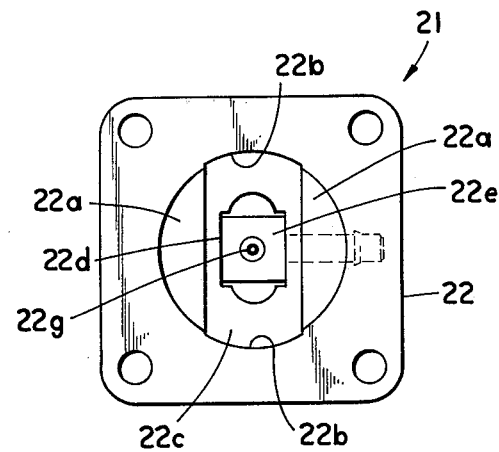
FIG. 9 is a bottom plan view of the upper portion of the fuel and air inlet valve.
Figure 10:
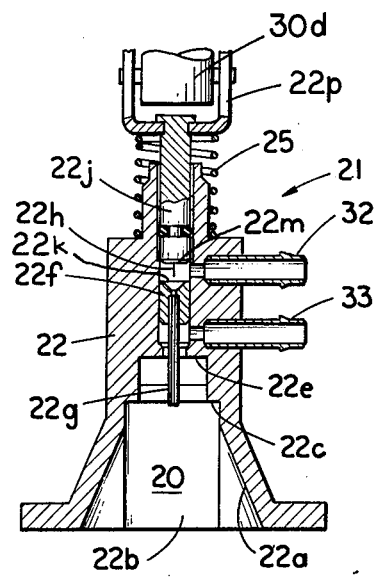
FIG. 10 is a side sectional view of the upper portion of the fuel and air inlet valve taken generally along the line 10—10 of FIG. 9.
Figure 11:
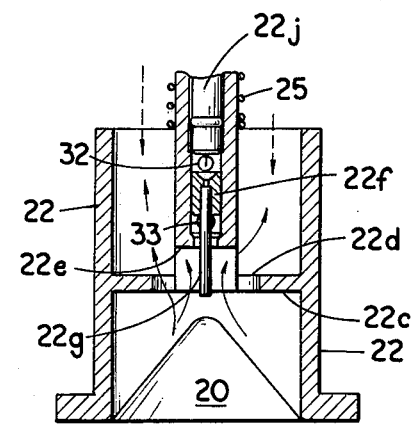
FIG. 11 is a side sectional view of the valve taken generally along the line 11—11 of FIG. 9.

Referring to FIGS. 9, 10 and 11, the fuel valve 21 will now be described in detail. As pointed out with reference to FIG. 1, the valve has a lower casting 23 which encloses an antechamber 46, the chamber being defined by the horizontal plate 44a (FIG. 1) in which are formed the apertures 44. A conical deflector 47 is centered on the upper side of the plate and a pin extending through the plate supports a flexible petal valve member 43, the valve functioning to permit an air-fuel mixture to move downwardly through the apertures 44 but flexing to pervent movement of exhaust gases back through the supports 44. The upper portion of the valve 21, the portion identified at 22 in FIG. 1, is shown in detail in FIGS. 9, 10 and 11. As will be evident from comparing FIGS. 9, 10 and 11, the casting 22 provides a generally frusto-conical chamber overlying the inlet side of the apertures 44 (FIG. 1). The chamber, as will be evident from FIG. 9, is elongated along two of its sides and these elongated sides are formed by inclined surfaces 22a which give it its generally conical configuration. The end surfaces 22b of the chamber are slightly curved transversely but extend vertically upward. The frusto-conical chamber is identified at 20 in FIG. 10. The smaller end of the chamber 20 is defined by a transverse baffle wall 22c having a central opening 22d (FIGS. 9 and 11) therein. A further baffle wall 22e is spaced from the baffle member 22c vertically and extends over the major portion of the central opening 22d, as will be evident from FIG. 9.

A central bore extends vertically through the casting 22 and accommodates a spud 22f from the lower portion of which extends a fuel supply orifice tube 22g, the tube extending freely through a central aperture in the baffle wall 22e with its axis aligned with the longitudinal axis of the chamber 20. The orifice spud 22f at its upper end provides a valve seat 22k against which the lower end 22m of stem member 22j closes, as will subsequently be described. Air under pressure is introduced through the tube 33 into the area below the spud 22f and passes through the annular space between the tube 22g and the central opening in the baffle wall 22e. Fuel is introduced under pressure into the area above the spud 22f through the tube 32 and moves downwardly through the orifice tube 22g to be discharged at the lower end of the orifice tube into the airstream flowing vertically downwardly around the tube.

In prior art fuel valve structures the starting and running air supply flows in a direction aligned with the axis of the venturi passage and the fuel metering orifice is conventionally positioned normal to this axis causing the fuel liquid to be introduced into the air stream at a right angle to the direction of flow of the air stream. Conventionally, the fuel enters the air stream either at its center or at its periphery and normal to the direction of air flow. It is also conventional in small pulse jet engines to arrange the fuel-air entrance ports (such as ports 44 of FIG. 1) to the combustion chamber in a circular pattern about the axis of the venturi passage and combustion chamber, with a central, conical deflector (such as deflector 47 of FIG. 1) to direct the fuel-air mixture to the ports. With this arrangement, injection of fuel at right angles to the air stream generally results in an uneven distribution of fuel in the air stream causing an over-rich mixture to reach some entrance ports while an over-lean mixture reaches other ports. While this condition can be endured when the engine is running, it can present a formidable problem in starting a cold engine. Ideally, upon starting a completely homogenous mixture of fuel and air should be delivered to all of the ports for admission to the combustion chamber. The fuel valve control structure of the present invention closely approaches this ideal condition by positioning the fuel stem 22g, not normal to the air flow but in line with the center of the conical deflector 47 and of the starting air stream. Referring to FIG. 10, starting air enters the inlet casting through the tube 33 and enters a cavity that surrounds the fuel stem 22g. From this cavity starting air is directed downwardly in a cylindrical flow path surrounding the fuel stem and aligned with it, the fuel stem being directed toward the apex of the conical deflector 47 (FIG. 1). This arrangement provides easier starting of the engine and assures that a homogenous fuel-air mixture continues to flow to the engine combustion chamber during operation of the engine.

The purpose of the baffle wall arrangement will be explained with reference to FIG. 11. In FIG. 11 the normal flow of air into the chamber 20 is indicated by broken line arrows downwardly directed. It is generally known in the art that although engine (petal) valves, such as provided by apertures 44 and petal member 43 (FIG. 1), are considered to be positively sealing on the explosion cycle of the engine, they do, in fact, permit a small amount of back flow of air fuel mixture, such back flow being indicated by the generally upwardly directed, solid line arrows in FIG. 11. In prior art valve structures this has resulted in some "spitting" of raw fuel back out of the air passage (the open upper end) of the valve as the engine operates, the magnitude of this unwanted flowing out of fuel being a function of the sealing efficiency of the valve formed by the petal member 43 and the apertures 44. Since the petal member 43 must flex with each pulse of the engine and must flex easily so as to admit the fresh change of air to the engine with each pulse, sealing efficiency with respect to back flow through the valve is sometimes sacrificed somewhat. The arrangement of the baffle walls 22c and 22e in the valve herein described substantially eliminates the potentially dangerous and inefficient throwing back of fuel out through the open upper end of the valve assembly, that is, through the normal air intake passage. As the solid line arrows in FIG. 11 indicate, any back flow of gases with entrained fuel droplets must move in a generally tortuous path, and none can flow in a straight line path except for that which moves through the small enlargements at each end of the aperture 22d (FIG. 9). Any gases thus moving out of the open upper end of the valve assembly are, prior to attaining that location, stripped of any fuel droplets because of the somewhat tortuous path which it must take. The construction is such as to give only a very reduced straight line path from the chamber 20 to the open upper end of the valve, that is, to atmosphere.

Figure 17:
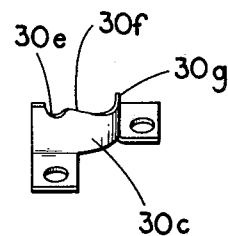
FIG. 17 is a perspective view of a cam member utilized in the assembly.
Figure 18:
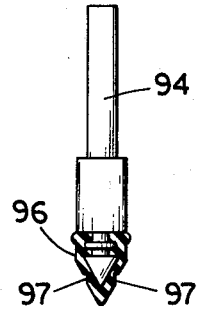
FIG. 18 is a perspective view of the valve actuating rod which cooperates with the cam shown in FIG. 17.

In relatively small pulse jet engines, particularly those of the type and size used in small portable fogging devices such as that described herein, the fuel flow is relatively small and an extremely small fuel metering orifice is required. Such small orifices are particularly sensitive to the presence of dirt or other foreign particles in the fuel. A relatively small particle can totally restrict the orifice disrupting the fuel flow to the engine. It is known in the prior art to employ a cleanout needle (slightly smaller than the orifice) positioned to enter the orifice and eject foreign particles therefrom. In the prior art devices the orifice and cleanout needle are positioned horizontally. In such arrangement the foreign particles in the fuel are carried to the orifice and held there by fuel and act to restrict or halt the flow of fuel to the engine. When the engine stops, in these prior art structures, the fuel pressure decays and releases the particle which falls back into the cavity below the orifice to again be carried to the orifice by the fuel flow when the engine is restarted. The cleanout needle is thus ineffective in discharging the particles from the fuel system and the needle is effective to force the particle through the orifice only when the particle remains lodged in the orifice. In the valve shown in FIGS. 9, 10 and 11 and the cleanout needle 22h is positioned above the vertically directed orifice tube 22f and is carried by the member 22j which is movable within the central bore of the upwardly extending portion of the casting 22, the member 22j being sealed in the bore by means of an o-ring seal. When the needle is at its lowermost portion within the orifice the surface 22m of the member 22j closes against the surface 22k of the member 22f to seal off or close the orifice. A resilient means taking the form of the compression spring 25 urges the member 22j and hence needle 22h upwardly. A rod 25a having an enlarged lower end 30d is pinned to yoke member 22p carried at the upper end of member 22j (FIGS. 10 and 18). As may be seen in FIGS. 3 and 18, the rod 25a extends upwardly through a horizontal, stationary plate 30. The rod 25a, shown in detail in FIG. 18, provides a means for manually moving the needle downwardly into the orifice, when necessary, to dislodge particles therefrom. Enclosing the major portion of the length of rod 25a is a compression spring 30a which bottoms on a shoulder 30b (FIG. 18) at the upper margin of the enlarged lower end 30d of the rod. The upper end of the spring holds a shouldered washer 30c upwardly against the underface of the stationary plate 30. The spring 30a thus functions to urge the rod 25a downwardly and biases the surface 22m (FIG. 10) into engagement with surface 22k to close off the orifice member 22f in the fuel valve when the rod is in its lowermost position. Controlled movement of the rod 25a by the operator of the apparatus is accomplished by means of the cam member 30c (FIG. 17), mounted on the upper face of plate 30, and having an upper edge providing a detent portion 30e which merges into a downwardly inclined portion 30f and a lower detent portion 30g. As may best be seen in FIG. 18, the upper end 25b extends sidewardly and carries member 25c whose curved face forms a lever which rides the cam surfaces 30e, 30f and 30g, the lowermost position of rod 25a, and the position in which needle 22h (FIG. 10) extends into orifice member 22f, is established by the seating of member 25c in the detent position 30g on the cam 30c. In this structure, the cleanout needle and the metering orifice are both positioned vertically so that foreign particles collect at the orifice insuring that they can be ejected through the orifice by the cleanout needle. To eject the particles collected at the fuel metering orifice, the operator vigorously strokes the starting air pump 26 with the ignition switch in off position. This causes pressure in the fuel tank to rise delivering fuel through line 32 to the space above the fuel metering orifice. With the tank pressurized, and continuing to stroke the air pump, the operator moves the lever 25c up and down the cam surface 30f (FIG. 18) rapidly, repeating this action several times and continuing to stroke the air pump. With each downward stroke of the rod 25a fuel present in the cavity of the orifice is pressurized by the descending surface 22m (FIG. 10), forcing fuel and any foreign particles to the orifice where they are either blown through the orifice or wedged therein. As previously mentioned, at the bottom of the downward stroke of the member 25a, the cleanout needle 22h enter the orifice and pushes any foreign particles wedged therein through the orifice. By repeatedly moving the lever member 25c up and down the cam surface, all foreign particles present in the cavity above the orifice are either hydraulically or mechanically ejected through the orifice. The spring 30a holds the lever 25c against the cam surface and overcomes the upward force of spring 25 (FIG. 10) to exert a net downward force sealing the fuel supply off at surfaces 22m and 22k when lever 25c is in the lower detent 30g (FIG. 17). This provides a positive closing off of the flow of fuel to the antechamber and to the combustion chamber to provide immediate shutdown of the combustion device, and this rapid closure of the fuel valve by a simple manual nudge of the lever 25c down the inclined cam surface has obvious safety advantages over the necessity to screw-turn downwardly a control knob to shut the fuel valve, as required in conventional fogging devices.

Figure 12:
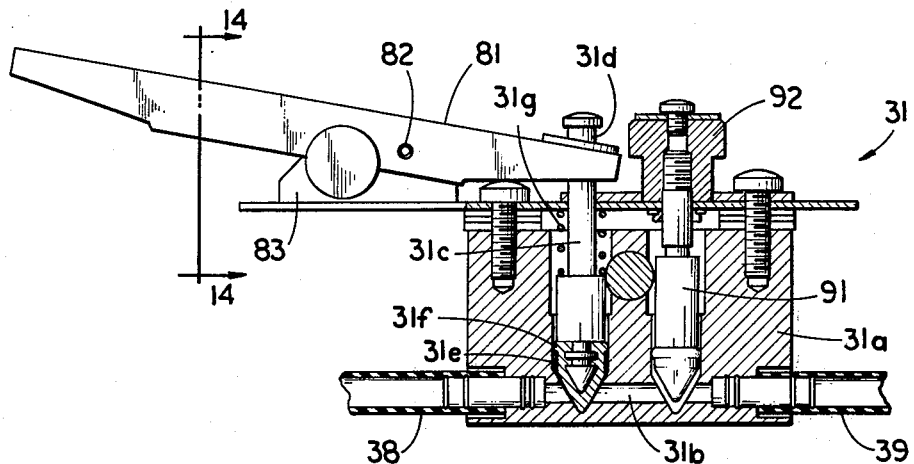
FIG. 12 is a side sectional view of the manually operated insecticide fluid control valve.
Figure 13:
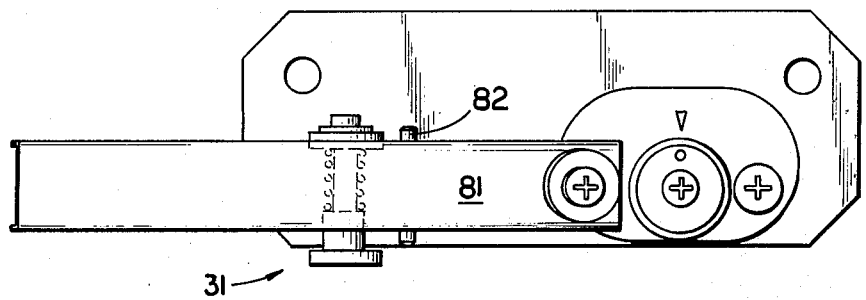
FIG. 13 is a top plan view of the structure shown in FIG. 12.

The insecticide fluid control valve will now be described in detail with reference to FIGS. 12, 13 and 14. The control valve 31 includes a housing 31a having a rectilinear fluid flow passage 31b, which is circular in cross section, extending through the housing. Supported in a suitable bore in the housing is a valve member 31c, the valve member, however, being adjustable movable within the bore transversely to the passage 31b. A conical cavity is formed in the housing having a longitudinal axis which intersects the centerline of the passage 31b, the junction of the passage and the conical cavity lying completely upon the inclined side surface of the conical cavity. The valve member 31c includes a stem portion 31d which extends exteriorly of the valve housing and carries a valve closure element 31e. The closure element 31e is unitarily molded of rubber of a similar elastomeric material and has a conical configuration closely fitting within the conical cavity, as indicated in FIG. 12, thus blocking the passage when the stem is in its downward extreme position. The closure element is provided with an integral, generally annular collar 31f spaced above the conical portion of the member. This collar 31f engages the bore within which the valve member moves and provides a dynamic seal for the valve member.

Figure 14:
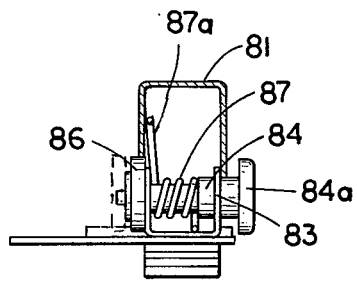
FIG. 14 is an end view of a handle structure shown in FIG. 12 and taken generally along the line 14—14 of FIG. 12.

The upper end 31d of the valve member extends freely through an opening in a lever 81 which is generally channel-shaped in cross section as will be evident from FIG. 14. The stem portion 31d carries an enlarged head which has a larger diameter than the aperture through which the stem 31d extends and there is thus provided at the adjacent end of the lever 81 on a one-way or unidirectional connection of the lever and stem so that upward movement of the lever end raises the valve member 31c, however, downward movement of the adjacent end of the lever 81 does not, itself, move the valve member 31c downwardly but permits it to be moved downwardly by the compression spring 31g. The lever 81 is pivoted about the transverse pin 82 which extends through the supporting bracket 83. As may be seen in FIG. 14, a pin 84 having an enlarged head 84a extends freely through an aperture in the supporting bracket 83 and, as may best be seen in FIG. 14, the depending flange portion of the lever 81 is provided with a cut-out portion which accommodates an enlarged shoulder 86 on the pin 84, the shoulder providing a radially extending abutment which, with the parts in the position shown in FIG. 14, closely engages the cut-out portion of the lever 81. When the head 84a of the pin 84 is moved leftwardly, as viewed in FIG. 14, the radial abutment 86 is moved leftwardly to its broken line position of FIG. 14 removing the abutment 86 from engagement with the lever 81 and permitting the lever to be pivoted counterclockwise, as viewed in FIG. 12, by manually depressing the end of the handle opposite its unidirectional attachment to the valve stem 31d.

A coil spring 87 (FIG. 14) acts as both a torsion and compression spring and functioning as a compression spring serves to bias the pin 84 rightwardly as viewed in FIG. 14 so that the abutment 86 engages and locks the lever 81 against pivotal motion. The end 87a of the spring is extended to engage the underside of the lever 81 and functions to bias the lever in a clockwise direction as viewed in FIG. 12, so that moving the handle portion of the lever 81 downwardly requires overcoming the torsional bias of the spring 87. The spring 87 thus provides a means both urging the assembly into locked position when the handle lever 81 is free and also urging the handle lever into released position so that valve 31e can close. In addition to permitting the operator to immediately stop flow of insecticide, by releasing lever 81, should the engine shut-down for any reason, this arrangement provides a "dead man" effect for the manual control of the insecticide control valve. If the handle lever 81 is released, for any reason, it is immediately re-locked by movement of abutment 86 into engagement with the lever and return of the lever to released position. Manual reopening of the insecticide control valve can again occur only by the two step procedure of pushing head 84a of pin 84 leftwardly (as viewed in FIG. 14) and rocking lever 81 counterclockwise (as viewed in FIG. 12) about its pivot 82.

Referring to FIG. 12 the valve body 31a also accommodates a further valve member 91 which, at its lower end, carries a conical, elastomeric portion which is sized to closely fit into a second conical cavity intersecting the longitudinal axis of the passage 31b. The upper end of the valve member 91 carries a head 92 and adjustment of the head 92 on the member 91 serves to establish the effective length of the valve member and thus the position of the conical lower portion of the valve member in the passage 31b. This establishes the maximum flow of insecticide fluids through the passge 31b to the fluid line 39 after the valve member 31c has been moved to open position by the handle lever 81. The valve member 31c thus functions as an on-off valve and the valve member 91 functions as a metering valve.

Figures 16, 16A:
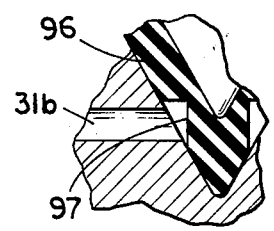
FIG. 16 is a side view, partially in section, illustrating a modified form of the valve closure shown in both FIGS. 12 and 15.
FIG. 16A is an enlarged, fragmentary view of the valve closure member of FIG. 16 seated in the conical cavity in the valve body.

Referring to FIG. 16 and 16A, a modified form of the valve members is indicated at 94. The valve member carries a unitarily molded elastomeric member 96 which has a conical configuration and is provided with two diemetrically opposite, flattened portions 97. As may best be seen in FIG. 16A the surface area of each of the flattened portions is larger than the area enclosed by the junction of the fluid passage 31b with the margin of the conical cavity receiving the member 96 in the valve body 31a. With this arrangement, when the closure member 96 is in its lowermost position in the conical valve body cavity, the sharpened, and possibly burred, edges of the junction of the passge 31b with the adjacent conical sidewall of the cavity are not contacted by the surface of the elastomeric valve member 96, this being evident from FIG. 16A. This arrangement prevents any cutting or abrasion of the elastomeric valve member 96 as it moves into its lowermost or passage-closing position.

Figure 15:
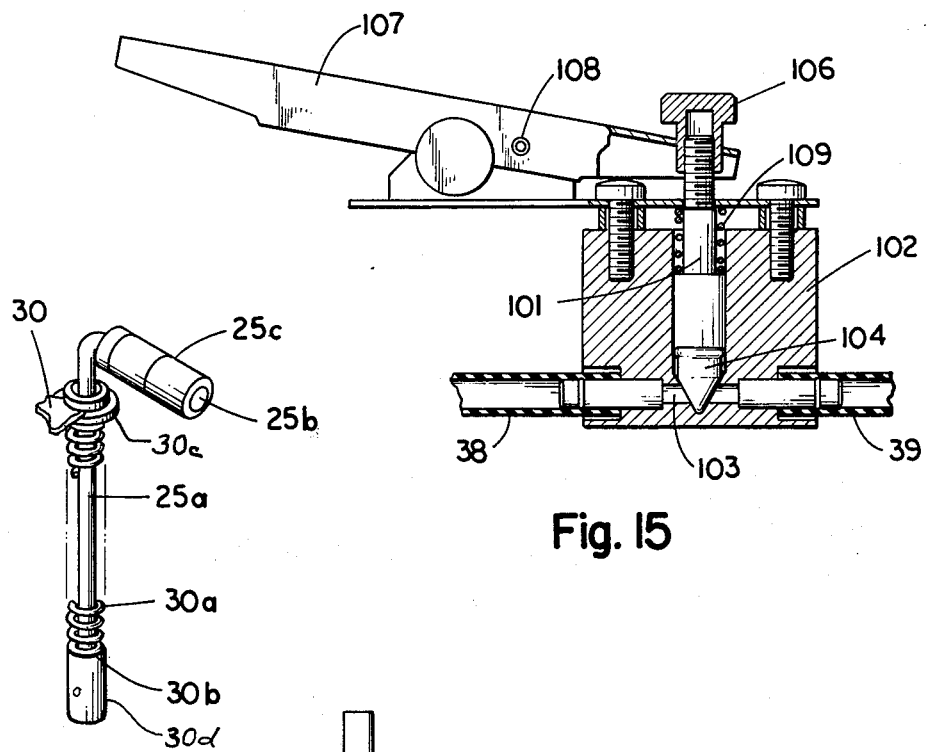
FIG. 15 is a side sectional view of an insecticide fluid control valve which is a modified form of the valve shown in FIG. 12 and utilizing only one valve closure member.

Referring to FIG. 15 a form of the insecticide fluid control valve which is modified from that of the structure shown in FIG. 12 will now be described. The structure of FIG. 15 differs, primarily, from that of FIG. 12 in that it utilizes a single valve member 101, movable in the valve housing 102, to control the flow of insecticide fluid through the rectilinear passage 103 in the valve housing. The valve member 101 carries a conically shaped, elastomeric element 104 and structurally is identical to the valve member 31c of FIG. 12. The upper end of the valve member 101 carries an adjustment knob 106 which can be adjusted upwardly or downwardly upon the threaded end of the valve member 101 and establishes the amount of upward travel imparted to the valve member 101 by actuation of the handle lever 107 which is pivoted at 108. The single valve member 101 thus acts as a shut-off valve in its lowermost position and, since its upper most position is limited by the adjustable knob 106 which is picked-up by the handle lever 107, it functions also as a metering valve for the insecticide fluid flowing through the passage 103 from the tube 38 to the tube 39. The compression spring 109 serves to bias the valve member 101 into closed position and is the counterpart of spring 31g of FIG. 12.

Prior art devices are customarily provided with an insecticide fluid control valve which includes only a metering valve adjustably threaded into flow obstructing position to determine the maximum rate of flow of fluid, the counterpart of valve member 91 of FIG. 12. Such valves do not provide for shutting the flow of fluid off rapidly should combustion cease in the pulse-jet engine but, instead, require that the adjustable metering element be threaded or turned down to completely closed position. Both of the control valve assemblies of FIG. 15 provide, in addition to the metering valve function (establishing a rate of flow of insecticide fluid), an on-off function which permits the flow of insecticide fluid to be immediately shut off by release of the operating handle. Flammable insecticide fluid is thus prevented from escaping to the hot engine exhaust tube upon engine shut-down.

Figure 3:
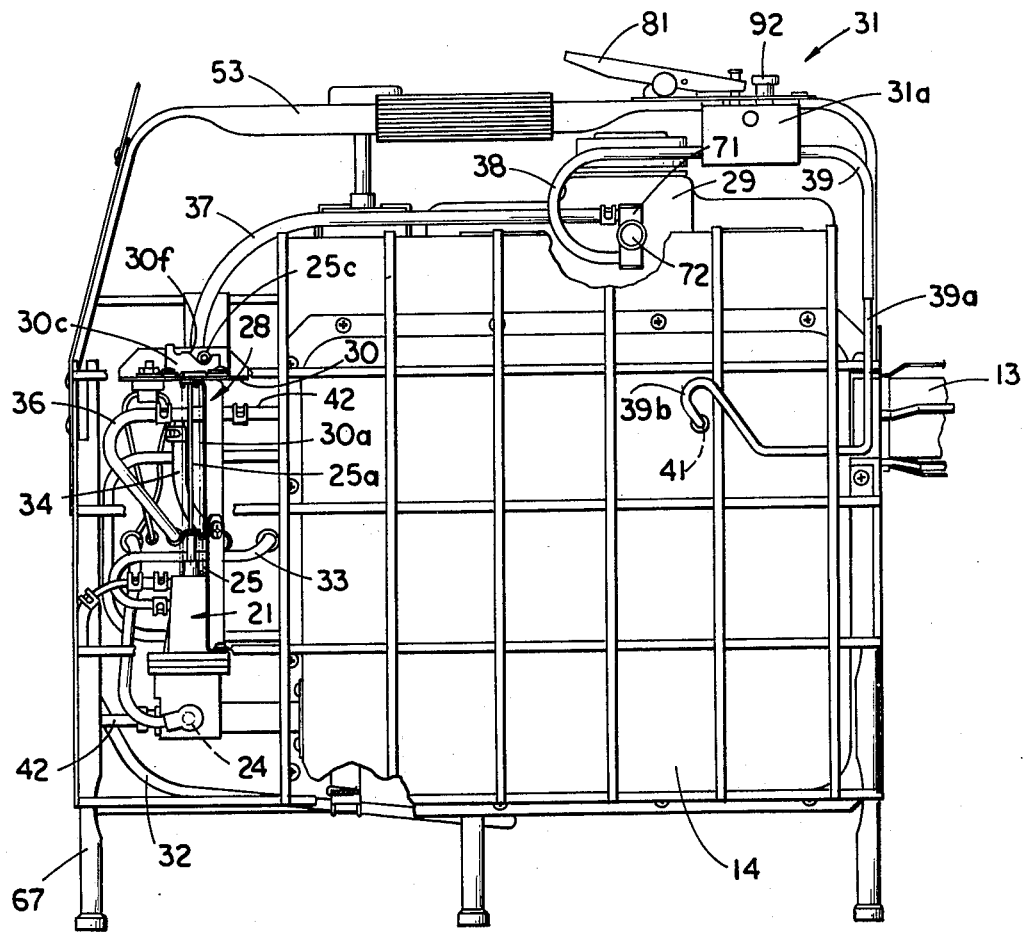
FIG. 3 is a side view of the structure shown in FIG. 2 but taken from the opposite side thereof and with a portion broken away.

Returning to FIG. 3, the structure forming a vapor trap in the insecticide fluid supply line 39 will now be described. In the structure of FIG. 3, the portion of the tube 39 which extends through the housings and into the fitting 41 (FIG. 1) which communicates with the interior of the exhaust tube 10, is formed by a relatively small diameter, rigid, stainless steel tube 39a, as shown in FIG. 3. The rigid tube 39a is formed so that it has a portion 39b, adjacent its discharge end communicating with the fitting 41, which is disposed at an elevated level with respect to the remaining portion of the tube adjacent the engine. This configuration thus forms a vapor trap cutting off the drainage of insecticide fluid into the exhaust tube upon cessation of combustion in the combustion device. If insecticide fluid standing in the tube 39 and its extension 39a, after closure of valve 31, were permitted to drain into the hot exhaust tube 10 after the combustion device has been stopped, combustion of this fluid might take place and present fire hazard to the operation. The vapor trap provided by the configuration of the stainless steel tube 29*a* prevents liquid from flowing into the combustion device after the combustion device has ceased operation. At shut down of the combustion device, the stainless steel tube 39*a* will normally be at an elevated temperature and will cause the insecticide fluid trapped between the valve 31 and the fitting 41 to be partially vaporized and to collect at the high point in the tube indicated at 39*b* in FIG. 3 and thus forming an insulating barrier.

To review the operation, at starting, the starting air pump 28 is stroked repeatedly which builds up the pressure in the fuel tank 27 sufficiently to force fuel into the valve 21 through the line 32. A transparent portion of tube 32 (identified at 32*a* in FIG. 4) gives a visual indication that fuel is flowing to valve 21. With lever 25*c* in upper detent 30*e* on the cam 30*c* holding member 22*j* in its position of FIG. 10, fuel is directed into the atomizing air stream through the tube 22*g* (FIG. 10), the air being initially supplied from the pump through the line 33. The fuel and air mixture moves through the petal valve apertures 43 into the antechamber 46 (FIG. 1). The burning gases are swept downstream into the combustion of the gases. Due to the burning action of the gases moving through the combustion chamber, a low pressure area is created in the antechamber 46 which then deflects the fingers of the petal valve 43 to their open position shown in FIG. 1 and a new charge of airfuel mixture is swept past the spark plug 24 and into the combustion chamber where the combustion cycle is again repeated. Shut down of the combustion device (as distinguished from stoppage of the flow of insecticide which is accomplished by releasing lever 81) is accomplished by moving lever 25*c* (FIG. 18) from the upper position 30*e* on cam 30*c* to the lower detent position 30*g* (FIG. 17).

The structure of the present invention provides an improved mounting arrangement for the components (on either side of the vertical plate 51) and provides an arrangement for the exhaust tube 10 and its nested housings 14 and 16 which permits convection air to sweep the tube 10 and cool it after the engine has been shut down. The fuel control valve 21 is arranged so as to eliminate back flow or blowback of raw fuel. The insecticide tank pressure can bleed off after the apparatus has been shut down so that pressure is not retained in this tank for a prolonged period, the bleed-off occuring through the aperture 28*f* in the check valve member 28*b* (FIG. 8). The insecticide fluid metering valve 31 incorporates a dual sealing valve stem and utilizes a single spring for both compression and torsion functions. The cleanout needle 22*h* (FIG. 10), being vertically arranged, has advantages over prior art structures as previously mentioned. Fuel is supplied through the tube 22*g* along the centerline of the valve and is not introduced at right angles to the air stream in starting as is conventional with prior art structures.

I claim:

1. A pulse fog generator including a resonant intermittent combustion device composed of a combustion chamber, a sinuous exhaust tube communicating with said combustion chamber, one end of said tube discharging the gases resulting from combustion, a fuel tank and means for injecting fuel from the tank into the combustion chamber, a container providing a reservoir of fluid, means to inject said fluid into the exhaust stream from the combustion chamber and being dispersed thereby in a finely divided condition, electrical ignition means for the combustion device and a manually operated air pump for providing an initial air charge to said combustion chamber and to said container and thus producing charging pressure for the fluid to be injected into the exhaust stream, a vertical plate supporting the combustion chamber and exhaust tube on one of its side faces and supporting the container, fuel tank, air pump and ignition means on the other side face so that the plate acts as a barrier between the combustion chamber element and the other components, said exhaust tube being enclosed in a housing supported in spaced relation to the adjacent face of said plate to thereby permit circulation of convection air flow between said housing and said plate, said means for injecting fuel into the combustion chamber including a fuel valve interposed between said fuel tank and said combustion chamber, said fuel valve having combustion chamber pressure controlled fuel delivery apertures for delivering an atomized fuel-air mixture to the combustion chamber, said fuel valve including means providing a generally frusto-conical chamber overlying the inlet side of said fuel delivery apertures with the smaller end of said chamber farthest from said fuel delivery apertures, the smaller end of said end of said chamber being defined by a transverse baffle wall having a central opening therein, a further baffle wall spaced from said first mentioned baffle wall and extending over the major portion of said central opening, a fuel supply orifice tube extending freely through a central aperture in said further baffle wall and aligned with the longitudinal axis of said frusto-conical chamber, means for supplying fuel under pressure to said orifice tube and means for supplying air to the area surrounding said tube so that as air flows into said frusto-conical chamber it flows parallel to said orifice tube to entrain fuel droplets issuing from the tube, the reverse flow of combustion gases through said frusto-conical chamber being impeded by said first mentioned baffle wall and the said extension of said further baffle wall over said central opening of the first mentioned baffle wall.

2. A pulse fog generator as claimed in claim 1 in which said frusto-conical chamber is disposed vertically with said orifice tube extending vertically into said chamber, a member supported for vertical movement above the upper end of said orifice tube, a clean-out wire extending from said member for protrusion into the bore of said orifice tube when said member is moved vertically downward, and resilient means urging said member into a limiting upward position in which said wire is spaced from said tube bore.

3. A pulse fog generator including a resonant intermittent combustion device composed of a combustion chamber, a sinuous exhaust tube communicating with said combustion chamber, one end of said tube discharging the gases resulting from combustion, a fuel tank and means for injecting fuel from the tank into the combustion chamber, a container providing a reservoir of fluid, means to inject said fluid into the exhaust stream from the combustion chamber and being dispersed thereby in a finely divided condition, electrial ignition means for the combustion device and a manually operated air pump for providing an initial air charge to said combustion chamber and to said container and thus producing charging pressure for the fluid to be injected into the exhaust stream, a vertical plate supporting the combustion chamber and exhaust tube on one of its side faces and supporting the container, fuel tank, air pump and ignition means on the other side face so that the plate acts as a barrier between the combustion chamber element and the other components, said exhaust tube being enclosed in a housing supported in spaced relation to the adjacent face of said plate to thereby permit circulation of convection air flow between said housing and said plate, a tube providing communication between said combustion chamber and the extreme upper portion of the interior of said fluid container and above the fluid level therein, and a check valve permitting the flow of gases into said container but substantially impeding the flow of gases out of the container to thereby pressurize the interior of said container upon the occurence of pressure pulses within said combustion chamber but to permit the interior of said container to return to atmospheric pressure after a time delay determined by the rate of reverse flow through said check valve subsequent to shut-down of said combustion device, said check valve taking the form of a tubular member formed of elastomeric material, the bore of said tubular member terminating at one end in a slot which is closed except when the bore is under a predetermined pressure, and a by-pass aperture formed in said tubular member which remains open independently of the open or closed position of said slot.

* * * * *